(12) United States Patent
Yang et al.

(10) Patent No.: US 9,910,551 B2
(45) Date of Patent: Mar. 6, 2018

(54) TOUCH DISPLAY PANEL AND DRIVING METHOD THEREFOR

(71) Applicants: SHANGHAI TIANMA MICRO-ELECTRONICS CO., LTD., Shanghai (CN); TIANMA MICRO-ELECTRONICS CO., LTD., Shenzhen (CN)

(72) Inventors: Kang Yang, Shanghai (CN); Conghua Ma, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 29 days.

(21) Appl. No.: 15/059,272

(22) Filed: Mar. 2, 2016

(65) Prior Publication Data

US 2016/0291793 A1    Oct. 6, 2016

(30) Foreign Application Priority Data

Apr. 1, 2015  (CN) .......................... 2015 1 0152949

(51) Int. Cl.
*G06F 3/041* (2006.01)
*G06F 3/044* (2006.01)

(52) U.S. Cl.
CPC ............ *G06F 3/044* (2013.01); *G06F 3/0416* (2013.01); *G06F 2203/04103* (2013.01)

(58) Field of Classification Search
CPC ...... G06F 3/044; G06F 3/0416; G06F 3/0418; G06F 2203/04103; G11C 19/28
See application file for complete search history.

(56) References Cited

U.S. PATENT DOCUMENTS

2011/0267283 A1    11/2011  Chang
2013/0314343 A1    11/2013  Cho et al.
(Continued)

FOREIGN PATENT DOCUMENTS

CN    103424909 A    12/2013
CN    103474039 A    12/2013
(Continued)

*Primary Examiner* — Richard Hong
(74) *Attorney, Agent, or Firm* — Kilpatrick Townsend & Stockton LLP

(57) ABSTRACT

A touch display panel and a driving method therefor are provided. The touch display panel can include: a substrate, multiple touch display units, a gate driving circuit and/or any other components. The substrate can include a display region and a border region. The multiple touch display units can be disposed in the display region, and each touch display unit can include multiple gate lines each extending in a first direction and multiple electrode blocks arranged in the first direction. The electrode blocks can be located opposite to the gate lines in a direction perpendicular to the substrate. The gate driving circuit can be disposed in the border region and can be electrically connected to each gate line. During a display driving stage, the gate driving circuit can scan the gate lines such that any two sequentially scanned gate lines are located in different touch display units. The starting signals for the any two sequentially scanned gate lines can partially overlap, and the starting signals for gate lines in a same touch display unit may not overlap.

13 Claims, 4 Drawing Sheets

(56) References Cited

U.S. PATENT DOCUMENTS

2014/0022476 A1 1/2014 Park et al.
2017/0025068 A1* 1/2017 Jeoung .................. G11C 19/28

FOREIGN PATENT DOCUMENTS

CN 104077996 A 10/2014
JP 2001042296 A 2/2001
KR 20080065463 A 7/2008

* cited by examiner

TOUCH DISPLAY PANEL AND DRIVING METHOD THEREFOR

CROSS REFERENCE OF RELATED APPLICATION

The present application claims the priority to Chinese Patent Application No. 201510152949.8, entitled "TOUCH DISPLAY PANEL AND DRIVING METHOD THEREFOR", filed on Apr. 1, 2015 with the State Intellectual Property Office of the PRC, which is incorporated herein by reference in its entirety.

FIELD

The disclosure relates to the field of the touch display technology, and in particular, to a touch display panel and a driving method for the touch display panel.

BACKGROUND

At early phases of development of the touch display, a touch display panel is formed by a combination of a touch panel and a display panel to achieve a touch display function. In this way, the touch panel and the display panel need to be manufactured independently, resulting in a high cost, a large thickness and a low production efficiency.

With the development of the touch-display integration technology, a common electrode in the display panel may function as touch sensing electrodes for touch detection; by driving in time-division mode, the touch control and the display control are performed in different time durations to achieve both the touch function and the display function. In this way, the touch sensing electrodes are directly integrated within the display panel, which reduces the fabrication cost, improves the production efficiency and reduces the thickness of the panel.

In the case that the common electrode further serves as the touch sensing electrodes, a common electrode layer needs to be divided into multiple electrode blocks. In addition, in order to achieve the touch control and the display control in a time-division way, each voltage block needs to be provided with a voltage signal via one independent wire; and by means of the wires, a touch sensing signal is provided for corresponding electrode blocks in a touch stage, and a common voltage signal is provided for corresponding electrode blocks in a display stage.

The conventional touch display panel can achieve both the touch function and the display function, but transversal striations may occur in an image displayed by the conventional touch display panel.

SUMMARY

A touch display panel and a driving method for the touch display panel are provided according to the disclosure, which can avoid a problem of transversal striations occurring in a displayed image.

Technical solutions of the disclosure are described as follows.

A touch display panel is provided, which can include a substrate, multiple touch display units, a gate driving circuit, and/or any other components. The substrate can include a display region and border region. The multiple touch display units can be disposed in the display region, where each touch display unit can include multiple gate lines. Each of the gate lines can extend in a first direction. The touch display unit can include multiple electrode blocks arranged in the first direction, and the multiple electrode blocks can be disposed opposite to the multiple gate lines in a direction perpendicular to the substrate. The gate driving circuit can be disposed in the border region, where the gate driving circuit can be electrically connected to each of the multiple gate lines.

During a display driving stage, the gate driving circuit cam be configured to scan the plurality of gate lines. Any two gate lines which are scanned sequentially can be located in different touch display units. Starting signals for the any two gate lines can be scanned sequentially partially overlap, and starting signals for gate lines in a same touch display unit may not overlap.

A driving method for the touch display panel described above is provided according to the disclosure. The method can include providing, during a display driving stage, a first voltage signal for the electrode blocks to achieve a display control via a common electrode layer; and providing, during a display driving stage, a first voltage signal for the electrode blocks to achieve a display control via a common electrode layer. The method can include providing, during a touch driving stage, a second voltage signal for the electrode blocks to achieve a touch detection via the common electrode layer, where the display driving stage is alternate with the touch driving stage; and during the display driving stage, any two gate lines which are scanned sequentially are located in different touch display units, starting signals for any two gate lines which are scanned sequentially partially overlap, and starting signals for gate lines in a same touch display unit do not overlap.

According to the above description, with the touch display panel according to the disclosure, during a scan process of the gate driving circuit, starting signals for two sequential scans partially overlap to achieve a pre-charging during the scan process; two gate lines corresponding to the starting signals for two sequential scans are not located in the same electrode block, thereby avoiding different coupling effects caused to the electrode blocks by the gate lines in the overlapping scan mode. Hence, a problem that a display image is uneven at the junctions between any two electrode blocks adjacent in the second direction is avoided, transversal striations are avoided from occurring at the junctions, and an image display quality is ensured.

BRIEF DESCRIPTION OF THE DRAWINGS

In order to illustrate technical solutions in embodiments of the disclosure or the conventional technology more clearly, hereinafter drawings for the description of the embodiments or the conventional technology are introduced simply. Apparently, the drawings described below are only for the embodiments of the disclosure, and other drawings may be obtained based on the provided drawings by those skilled in the art without any creative work.

DETAILED DESCRIPTION OF THE EMBODIMENTS

Hereinafter technical solutions of embodiments of the disclosure are described clearly and completely in conjunction with drawings of the embodiments of the disclosure. Apparently, the described embodiments are only some embodiments of the application, but not all the embodiments. Any other embodiments obtained based on the embodiments of the disclosure by those skilled in the art without any creative work fall within the scope of protection of the application.

Figure 1:
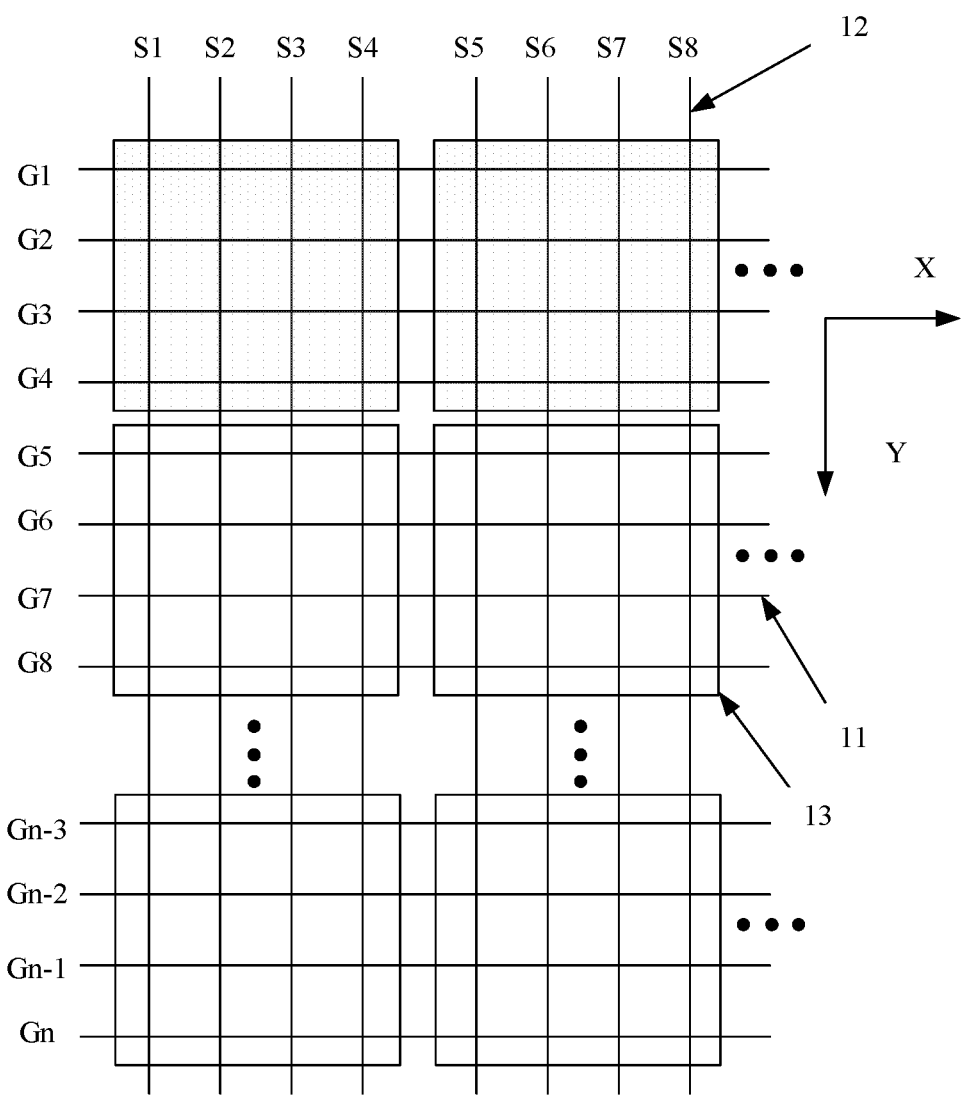
FIG. 1 is a schematic structural diagram of a touch display panel.

Reference is made to FIG. 1, which is a schematic structural diagram of a touch display panel. The touch display panel includes: multiple gate lines 11, multiple data lines 12 and a common electrode layer.

Each of the gate lines 11 is extended in a first direction X, and the gate lines 11 are parallel with each other and spaced from each other. Each of the data lines 12 is extended in a second direction Y, and the data lines 12 are parallel with each other and spaced from each other. The common electrode layer is disposed above the gate lines 11 and the data lines 12, and includes multiple electrode blocks 13 which are insulated from each other and arranged in an array. FIG. 1 shows a first gate line G1 to an n-th gate line Gn, a first data line Si to the eighth data line S8, and six electrode blocks 13 arranged in an array. Here n is the number of gate lines, and n is a positive integer greater than 1.

One electrode block wire is disposed independently for each electrode block 13. FIG. 1 does not show the electrode block wires. Generally, the electrode block wires can provide a common signal for the electrode blocks 13 during an image displaying performed by the touch display panel, and provide a touch signal for the electrode blocks 13 during a touch detection performed by the touch display panel.

In order to ensure an image display effect under an unchanged frame frequency for image displaying, one original scan period can be divided into a touch stage and a display stage during a scan process. In this way, scan time in the display stage is shortened, i.e., time during which respective pixel units are charged through the gate lines is shortened. Hence, a gate driving circuit of the touch display panel generally scans the gate lines in an overlapping scan mode. In this way, a next gate line can be pre-charged while a current gate line is scanned.

Figure 2:
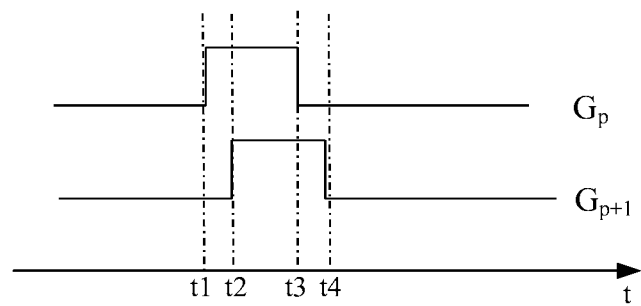
FIG. 2 is a waveform under an overlapping scan mode.

With the conventional drive method, the gate lines in the touch display panel can be scanned one by one. For example, in case of a forward scan, the scan can be performed from the first gate line $G_1$ to the n-th gate line $G_n$ one by one. As shown in FIG. 2, starting signals for any adjacent gate lines partially overlap, where t represents a timeline.

At a time instant t1, a starting signal can be input to a p-th gate line $G_p$ to start charging pixel units connected to the p-th gate line $G_p$; and at a time instant t3, the starting signal can be stopped from being input to the p-th gate line $G_p$, and charging of the pixel units connected to the p-th gate line $G_p$ is finished. In order to ensure a frame frequency for image displaying, time during which pixel units connected to a (p+1)-th gate line $G_{p+1}$ are charged needs to be shortened; hence, the (p+1)-th gate line $G_{p+1}$ needs to be pre-charged after the time instant t1 and before the time instant t3. At a time instant t2, a starting signal is input to the (p+1)-th gate line $G_{p+1}$ to start charging pixel units connected to the (p+1)-th gate line $G_{p+1}$; and at a time instant t4, the starting signal is stopped from being input to the (p+1)-th gate line $G_{p+1}$, and charging of the pixel units connected to the (p+1)-th gate line $G_{p+1}$ is finished. Here p is a positive integer less than n.

Since starting signals for two adjacent gate lines 11 partially overlap, a coupling capacitor may be generated between the gate lines 11 and the electrode blocks 13 or between the gate lines 11 and pixel electrodes. For each electrode block 13, in an overlapping scan mode, the gate lines 11 may cause a coupling effect to the common signal in the electrode block 13, where the coupling effect is consistent with a scanning sequence of the gate lines.

For gate lines corresponding to the electrode block 13, coupling effects of gate lines 11 excluding a top gate line 11 and a bottom gate line 11 are the same. However, in the second direction Y, a starting signal for the top gate line 11 of a certain electrode block 13 partially overlaps with a starting signal for the bottom gate line 11 of a preceding electrode block 13 adjacent to the certain electrode block 13, and a starting signal for the bottom gate line 11 of the certain electrode block 13 partially overlaps with a starting signal for the top gate line 11 of a next electrode block 13 adjacent to the certain electrode block 13; therefore, the coupling effects of gate lines 11 located at boundaries of one electrode block 13 are different from the coupling effects of other gate lines 11 in the same electrode block 13. For example, for an electrode block 13 located in a first row and a first column, in case of scanning the first gate line G1, a second gate line G2 and a third gate line G3, coupling effect of each gate lines G1 to G3 may happen to the electrode block 13 located in the first row and the first column; and in case of scanning a fourth gate line G4, a fifth gate line G5 is pre-charged and a coupling effect may happen to an electrode block 13 located in a second row and a second column.

According to the above description, with the conventional driving method, coupling effects of gate lines 11 at boundaries of two electrode blocks 13 adjacent in the second direction Y can be different from coupling effects at other locations, which can result in an uneven display image at junctions between the electrode blocks 13, and transversal striations at the junctions. The junctions may be referred to places between two electrode blocks 13 which are adjacent to each other in the second direction Y.

Figure 3:
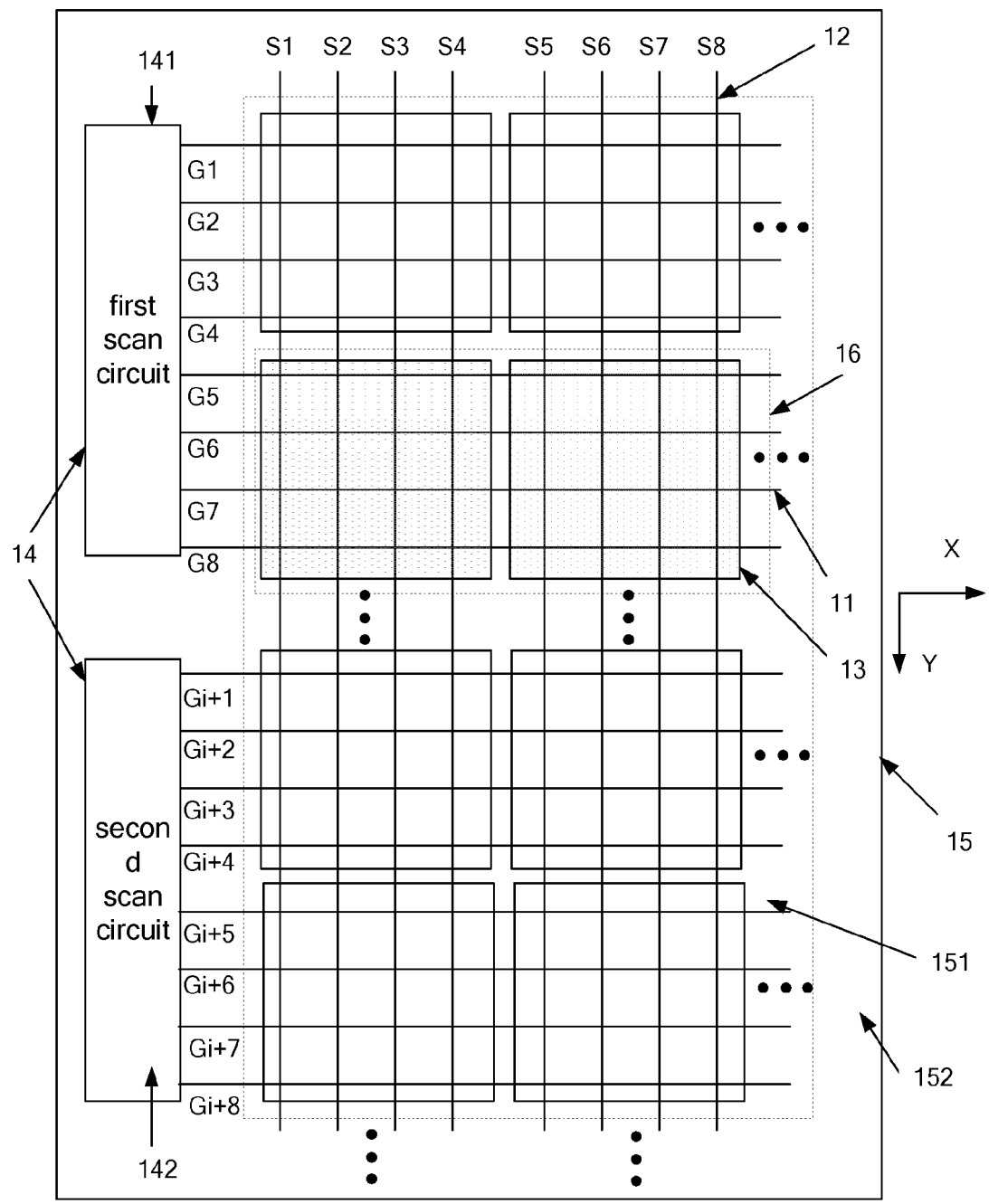
FIG. 3 is a schematic structural diagram of a touch display panel according to an embodiment of the disclosure.

To solve the above problem, a touch display panel is provided according to an embodiment of the disclosure. Reference is made to FIG. 3, which is a schematic structural diagram of the touch display panel according to the embodiment of the disclosure. The touch display panel can include: a substrate 15 including a display region 151 and a border region 152; a gate layer disposed in the display region 151, where the gate layer includes multiple gate lines 11 each extended in a first direction X; a common electrode layer disposed in the display region 151, where the common electrode layer is disposed opposite to the gate layer and includes multiple electrode blocks 13, and the electrode blocks 13 are arranged in an array in the first direction X and a second direction Y perpendicular to the first direction X; and a gate driving circuit 14 disposed in the border region 152, where the gate driving circuit 14 is electrically connected to each gate line 11.

The touch display panel can include multiple data lines 12 each extended in the second direction. In case of scanning the gate lines, pixel units connected to the gate lines 11 are charged via the data lines 12. For the electrode block array, a row direction is the first direction X and a column direction is the second direction Y.

The touch display panel can include multiple touch display units 16 disposed in the display region 151. The touch display unit 16 can include at least one electrode block 13 and at least two gate lines 11. The multiple electrode blocks 13 can be disposed opposite to the multiple gate lines 11 in a direction perpendicular to the substrate 15. During a display driving stage, the gate driving circuit 14 is for scanning the respective gate lines 11, and any two gate lines 11 scanned sequentially can be located in different touch display units 16. Starting signals for any two gate lines 11 scanned sequentially can partially overlap, and starting signals for gate lines 11 in a same touch display unit 16 may not overlap.

It can be seen from FIG. 3 that, with the touch display panel according to one embodiment of the disclosure, the gate driving circuit 14 can scan the gate lines 11 in a scan order different from conventional forward scan (scanning from the first gate line to the n-th gate line row by row) or reverse scan (scanning from the n-th gate line to the first gate line row by row). During a scan process of the gate driving circuit 14, starting signals for two sequential scans can partially overlap to achieve a pre-charging during the scan process; two gate lines corresponding to the starting signals for two sequential scans may not be located in the same electrode block 13, thereby avoiding different coupling effects happening to the electrode blocks 13 by the gate lines 11 in an overlapping scan mode. Hence, a problem of uneven display image at the junctions between any two electrode blocks 13 adjacent in the second direction Y can be avoided, transversal striations can be avoided from occurring at the junctions, and an image display quality can be ensured.

The touch display panel includes multiple touch display units. The multiple touch display units can include a first touch display unit to an M-th touch display unit sequentially arranged in the second direction Y, where M is a positive integer greater than 1. One touch display unit 16 corresponds to multiple gate lines; accordingly, M is smaller than n.

In a case that an overlapping region of durations of two sequential starting signals from the gate driving circuit 14 is greater than or equal to ½ of the duration of each of the two sequential starting signals, the gate driving circuit 14 can include a first scan circuit 141 and a second scan circuit 142, as shown in FIG. 3. Any two gate lines 11 which are scanned sequentially can be electrically connected to different scan circuits.

During a complete scan performed by the gate driving circuit 14, to ensure that any two gate lines 11 which are scanned sequentially are located in different touch display units 16, starting signals for any two gate lines 11 which are scanned sequentially can partially overlap, and starting signals for gate lines corresponding to the same touch display unit 16 may not overlap, the following arrangement may be applied: starting signals for two scans sequentially performed by the first scan circuit 141 do not overlap; starting signals for two scans sequentially performed by the second scan circuit 142 do not overlap; a starting signal for an I-th scan performed by the first scan circuit 141 partially overlaps with a starting signal for an I-th scan performed by the second scan circuit 142, where I is a positive integer not greater than either of the number of scans performed by the first scan circuit 141 and the number of scans performed by the second scan circuit 142.

Figure 4:
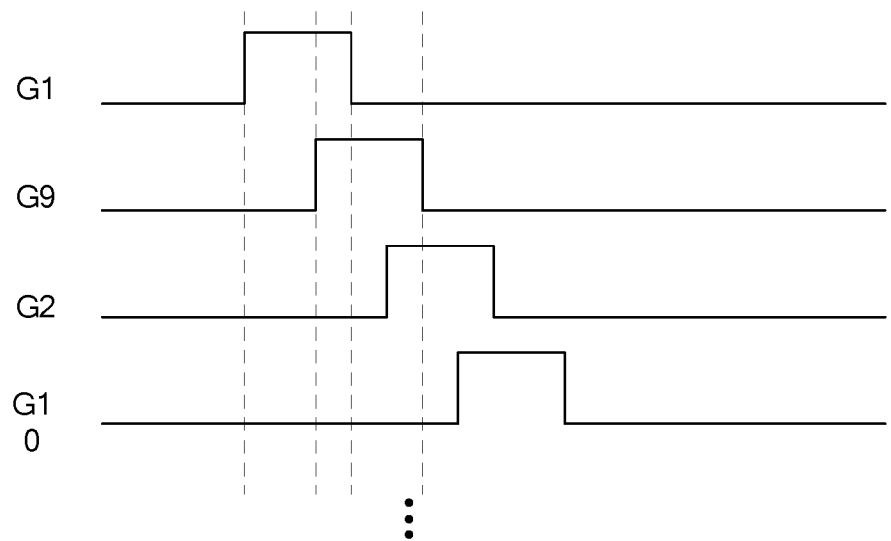
FIG. 4 is a sequence diagram of starting signals according to an embodiment of the disclosure.

As shown in FIG. 4, it is assumed that there are total 16 gate lines, and gate lines G1, G9, G2, G10, G3, G11, G4, G12, G5, G13, G6, G14, G7, G15, G8 and G16 can be scanned sequentially. In this way, if the overlapping region of the durations of two sequential starting signals is less than ½ of the duration of each of the two sequential starting signals, starting signals for G1 and G9 overlap, G1 and G9 are located in different touch units, i.e., G1 and G9 correspond to different electrode blocks; starting signals for G9 and G2 overlap, G9 and G2 are located in different touch units. Since the overlapping region of the durations of two sequential starting signals is less than ½ of the duration of each of the two sequential starting signals, starting signals for G1 and G2 do not overlap and G1 and G2 correspond to the same electrode block.

In addition, after G1 and G9 are scanned, it may not return to an electrode block to which G1 corresponds to scan G2, and gate lines corresponding to electrode blocks other than an electrode block to which G5 corresponds may be scanned subsequently.

In addition, in the case that the ratio of the overlapping region of the durations of two sequential starting signals over the duration of each of the two sequential starting signals is less than ½, for example being equal to ⅓, one more row of electrode blocks may be utilized, i.e., in the case that 3 scans are performed, it returns to any un-scanned gate line corresponding to an electrode block to which an initially scanned gate line corresponds.

The first scan circuit 141 is for scanning gate lines 11 located in the first touch display unit to an m-th touch display unit. The second scan circuit 142 is for scanning gate lines located in an (m+1)-th touch display unit to the M-th touch display unit, where m is a positive integer less than M. Under the above-mentioned scan order, any two gate lines 11 which are scanned sequentially are connected to different scan circuits.

If the first touch display unit to the m-th touch display unit include a total of i gate lines and the (m+1)-th touch display unit to the M-th touch display unit include a total of j gate lines, where i and j are integers, during one scan period, the first scan circuit 141 and the second scan circuit 142 can each perform J scans, where J is a positive integer. In the case that i=j, J=i; or in the case that i≠j, J is equal to the greater one of i and j.

If the first scan circuit 141 and the second scan circuit 142 each perform J scans, in the case that i is less than j, J=j, and the first scan circuit 141 needs to perform j-i null scans after the first scan circuit 141 and the second scan circuit 142 each perform i scans. In the case that i is greater than j, J=i, and the second scan circuit 142 performs i-j null scans after the first scan circuit 141 and the second scan circuit 142 each perform j scans. Here, the first scan circuit 141 and the second scan circuit 142 can scan alternately, i.e., among multiple scans performed by the gate driving circuit 14 according to the above-mentioned scan order, one of the first scan circuit 141 and the second scan circuit 142 can perform even-numbered scans, and the other one can perform odd-numbered scans. By performing the null scans, the scan numbers of the two scan circuits are the same in the case that i≠j. Hence, the first scan circuit 141 has a same shift register cascading structure with the second scan circuit 142, where shift registers for the null scans are not connected to the gate lines, such that the gate driving circuit 14 is disposed symmetrically, which is convenient for circuit layout.

If the first touch display unit to the m-th touch display unit include a total of i gate lines 11 and the (m+1)-th touch display unit to the M-th touch display unit include a total of j gate lines 11, where i and j are integers, during one scan period, the first scan circuit 141 can perform i scans and the second scan circuit 142 can perform j scans. In this case, a scan cut-off signal is input to the first scan circuit 141 when the first scan circuit 141 finishes an i-th scan, and a scan cut-off signal is input to the second scan circuit 142 when the second scan circuit 142 finishes a j-th scan. Here, in a case that one of the first scan circuit 141 and the second scan circuit 142 finishes scanning first, the other one continues to scan gate lines 11 remained to be scanned while no null scan is performed, thereby reducing the power consumption.

During a complete scan performed by the gate driving circuit 14, to ensure that any two gate lines 11 which are scanned sequentially are located in different touch display units 16, starting signals for any two gate lines 11 which are scanned sequentially can partially overlap, and starting signals for gate lines corresponding to the same touch display unit 16 may not overlap, the following arrangement may be applied: starting signals for two scans sequentially performed by the first scan circuit 141 do not overlap; starting signals for two scans sequentially performed by the second scan circuit 142 do not overlap; a starting signal for an I-th scan performed by the first scan circuit 141 partially overlaps with a starting signal for an I-th scan performed by the second scan circuit 142, where I is a positive integer not greater than either of i and j.

In order to ensure a normal display, in the case that i is less than j, after the scan cut-off signal is input to the first scan circuit 141, the whole scan process of the gate driving circuit comes to a first blank stage until the scan cut-off signal is input to the second scan circuit 142. In the case that i is greater than j, after the scan cut-off signal is input to the second scan circuit 142, the whole scan process of the gate driving circuit comes to a second blank stage until the scan cut-off signal is input to the first scan circuit 141.

The first scan circuit 141 has a same scan period with the second scan circuit 142. A scan initialization signal for the first scan circuit 141 is supplied earlier than a scan initialization signal for the second scan circuit 142, or the scan initialization signal for the second scan circuit 142 is supplied earlier than the scan initialization signal for the first scan circuit 141.

As described above, in the case that the overlapping region of the durations of starting signals for two sequential scans is greater than or equal to ½ of the duration of each of the starting signals for the two sequential scans, the gate driving circuit 14 is provided with a first scan circuit 141 and a second scan circuit 142. In this case, for facilitating circuit design, M can be set as an even number, m=M/2, numbers of gate lines in the respective touch display units can be the same, and numbers of electrode blocks in the respective touch display units can be the same.

Figure 5:
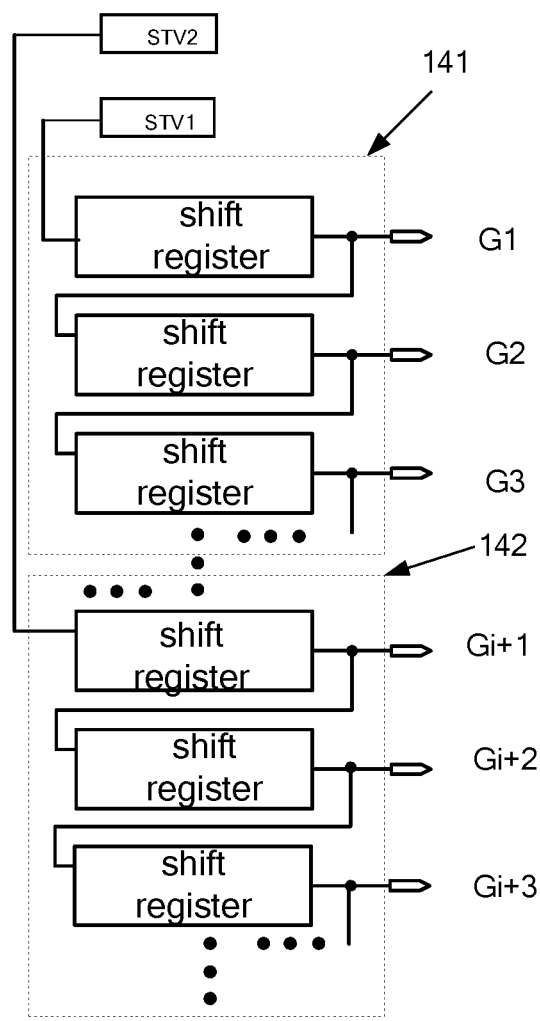
FIG. 5 is a schematic structural diagram of a gate driving circuit according to an embodiment of the disclosure.

Reference is made to FIG. 5, which is a schematic structural diagram of a gate driving circuit according to an embodiment of the disclosure. Shift registers in the first scan circuit 141 are cascaded, shift registers in the second scan circuit 142 are also cascaded, and the first scan circuit 141 and the second scan circuit 142 each perform a forward scan. In the two scan circuits, an output from one stage of shift register functions as an input to a next stage of shift register. A scan initialization signal STV1 is input to a first stage of shift register of the first scan circuit 141, and a scan initialization signal STV2 is input to a first stage of shift register of the second scan circuit 142. Output terminals of the scan circuits are respectively connected to corresponding gate lines. The gate driving circuit shown in FIG. 5 is applied as the gate driving circuit in the touch display panel shown in FIG. 3.

If the ratio of the overlapping region of the durations of starting signals for two sequential scans over the duration of each of the starting signals for the two sequential scans is greater than or equal to ⅓, and less than ½, the gate driving circuit 14 is provided with a first scan circuit, a second scan circuit and a third scan circuit. Accordingly, m touch display units may be divided into a first set of touch display units, a second set of touch display units and a third set of touch display units in the second direction Y. Gate lines in the first set of touch display units are all connected to the first scan circuit, gate lines in the second set of touch display units are all connected to the second scan circuit, and gate lines in the third set of touch display units are all connected to the third scan circuit. In this case, transversal striations can be avoided from occurring on the display image by setting a scan sequence of the scan circuits.

According to the above description, with the gate driving circuit, transversal striations can be avoided from occurring on an image displayed by the touch display panel according to the embodiment of the disclosure, thereby ensuring an image display effect.

A driving method for the touch display panel according to the above embodiments is provided according to an embodiment of the disclosure.

The driving method can include: providing, during a display driving stage, a first voltage signal for the electrode blocks to achieve a display control via a common electrode layer; and providing, during a touch driving stage, a second voltage signal for the electrode blocks to achieve a touch detection via the common electrode layer.

The drive method can include multiple display driving stages and multiple touch driving stages. The display driving stages are alternate with the touch driving stages, to drive the touch detection and the image display in a time-division mode.

During the display driving stage, any two gate lines which are scanned sequentially can be located in different touch display units, starting signals for any two gate lines which are scanned sequentially can partially overlap, and starting signals for gate lines in a same touch display unit may not overlap.

It should be noted that, the driving method of the disclosure is applied to the touch display panel, and the method embodiment and the apparatus embodiment may be complemented and illustrated with each other.

In the case that the touch display panel is driven by using the driving method according to the embodiment of the disclosure, starting signals for two sequential scans partially overlap to achieve pre-charging during a scan process; two gate lines corresponding to starting signals for two sequential scans are not located in a same touch display unit, thereby avoiding different coupling effects caused to the electrode blocks by the gate lines in the overlapping scan mode. Hence, a problem that a display image is uneven at the junctions between any two adjacent electrode blocks is avoided, transversal striations are avoided from occurring at the junctions, and an image display quality is ensured.

The above illustration of the disclosed embodiments can enable those skilled in the art to practice or use the disclosure. Multiple changes to these embodiments are apparent for those skilled in the art, and general principles defined herein may be implemented in other embodiments without departing from the spirit or scope of the disclosure. Hence, the disclosure is not limited to these embodiments disclosed herein, but is to conform to the widest scope consistent with principles and novel features disclosed herein.

The invention claimed is:
1. A touch display panel, comprising:
a substrate comprising a display region and a border region;
a plurality of touch display units disposed in the display region, wherein each touch display unit comprises a plurality of gate lines each extending in a first direction and a plurality of electrode blocks arranged in the first direction, the plurality of electrode blocks being disposed opposite to the plurality of gate lines in a direction perpendicular to the substrate; and a gate driving circuit disposed in the border region, and is electrically connected to each of the plurality of gate lines, wherein the gate driving circuit comprises a first scan circuit and a second scan circuit, and any two of the gate lines which are scanned sequentially are electrically connected to different scan circuits, wherein during a display driving stage, the first scan circuit and the second scan circuit are configured to scan the plurality of gate lines in different touch display units such that any two of the plurality of gate lines which are scanned sequentially are located in any two of the different touch display units, wherein starting signals for the any two gate lines which are scanned sequentially partially overlap, and starting signals for gate lines in a same touch display unit do not overlap.

2. The touch display panel according to claim 1, wherein the touch display panel comprises multiple touch display units, and the multiple touch display units comprise a first touch display unit to an M-th touch display unit sequentially arranged in a second direction, wherein M is a positive integer greater than 1; and, wherein the first scan circuit is configured to scan gate lines in the first touch display unit to an m-th touch display unit; and the second scan circuit is configured to scan gate lines in an (m+1)-th touch display unit to the M-th touch display unit, wherein m is a positive integer less than M.

3. The touch display panel according to claim 2, wherein the first touch display unit to the m-th touch display unit comprise i gate lines, and the (m+1)-th touch display unit to the M-th touch display unit comprise j gate lines, wherein i and j are integers;

the first scan circuit and the second scan circuit are configured to perform J scans during one scan period, where J is a positive integer; and, wherein when i=j, J=i; or when i≠j, J is equal to the greater one of i and j.

4. The touch display panel according to claim 3, wherein starting signals for two scans sequentially performed by the first scan circuit do not overlap;

starting signals for two scans sequentially performed by the second scan circuit do not overlap; and a starting signal for an I-th scan performed by the first scan circuit partially overlaps with a starting signal for an I-th scan performed by the second scan circuit, wherein I is a positive integer not greater than J.

5. The touch display panel according to claim 4, wherein in the case that i is less than j, J=j, and the first scan circuit performs j-i null scans after the first scan circuit and the second scan circuit each perform i scans.

6. The touch display panel according to claim 4, wherein when i is greater than j, J=i, the second scan circuit performs i-j null scans after the first scan circuit and the second scan circuit each perform j scans.

7. The touch display panel according to claim 2, wherein the first touch display unit to the m-th touch display unit comprise i gate lines, and the (m+1)-th touch display unit to the M-th touch display unit comprise j gate lines, wherein i and j are integers;

the first scan circuit is configured to perform i scans during one scan period, and the second scan circuit is configured to perform j scans during one scan period; and a scan cut-off signal is input to the first scan circuit when the first scan circuit finishes an i-th scan, and a scan cut-off signal is input to the second scan circuit when the second scan circuit finishes a j-th scan.

8. The touch display panel according to claim 7, wherein for the first scan circuit, starting signals for two sequential scans do not overlap;

for the second scan circuit, starting signals for two sequential scans do not overlap; and a starting signal for an I-th scan performed by the first scan circuit partially overlaps with a starting signal for an I-th scan performed by the second scan circuit, where I is a positive integer not greater than either of i and j.

9. The touch display panel according to claim 7, wherein when i is less than j, a first blank stage starts when the scan cut-off signal is input to the first scan circuit and ends when the scan cut-off signal is input to the second scan circuit.

10. The touch display panel according to claim 7, wherein when i is greater than j, a second blank stage starts when the scan cut-off signal is input to the second scan circuit and ends when the scan cut-off signal is input to the first scan circuit.

11. The touch display panel according to claim 2, wherein the first scan circuit has a same scan period with the second scan circuit; and a scan initialization signal for the first scan circuit is supplied earlier than a scan initialization signal for the second scan circuit, or the scan initialization signal for the second scan circuit is supplied earlier than the scan initialization signal for the first scan circuit.

12. The touch display panel according to claim 11, wherein M is an even number and m=M/2; and wherein the respective touch display units have a same number of gate lines and a same number of electrode blocks.

13. A driving method for the touch display panel according to claim 1, comprising:

providing, during a display driving stage, a first voltage signal for the electrode blocks to achieve a display control; and providing, during a touch driving stage, a second voltage signal for the electrode blocks to achieve a touch detection, wherein the display driving stage is alternate with the touch driving stage.

* * * * *